United States Patent
Fink et al.

(10) Patent No.: US 11,546,438 B2
(45) Date of Patent: Jan. 3, 2023

(54) SERVING ASSETS IN A NETWORKED ENVIRONMENT

(71) Applicant: Palantir Technologies Inc., Denver, CO (US)

(72) Inventors: Robert Fink, Munich (DE); Ashwin Ramaswamy, New York, NY (US); Benjamin Duffield, New York, NY (US); Bradley Moylan, Palo Alto, CA (US); Greg DeArment, Seattle, WA (US); Jared Newman, Costa Mesa, CA (US); Mark Elliot, London (GB)

(73) Assignee: Palantir Technologies Inc., Denver, CO (US)

(*) Notice: Subject to any disclaimer, the term of this patent is extended or adjusted under 35 U.S.C. 154(b) by 0 days.

(21) Appl. No.: 17/512,361

(22) Filed: Oct. 27, 2021

(65) Prior Publication Data

US 2022/0124161 A1    Apr. 21, 2022

Related U.S. Application Data

(63) Continuation of application No. 16/165,229, filed on Oct. 19, 2018, now Pat. No. 11,206,310.

(30) Foreign Application Priority Data

Oct. 20, 2017 (GB) ...................................... 1717251

(51) Int. Cl.
*H04L 67/51* (2022.01)
*G06F 8/71* (2018.01)
(Continued)

(52) U.S. Cl.
CPC ................ *H04L 67/51* (2022.05); *G06F 8/71* (2013.01); *H04L 63/08* (2013.01); *H04L 63/105* (2013.01); *H04L 67/02* (2013.01)

(58) Field of Classification Search
CPC ....... H04L 67/51; H04L 63/08; H04L 63/105; H04L 67/02; G06F 8/71
See application file for complete search history.

(56) References Cited

U.S. PATENT DOCUMENTS

| | | | |
|---|---|---|---|
| 8,996,588 B2 * | 3/2015 | Ko ........................ | G06F 16/972 707/803 |
| 9,264,395 B1 * | 2/2016 | Stamos ............... | H04L 63/1408 |

(Continued)

OTHER PUBLICATIONS

U.S. Pat. No. 11,206,310, Serving Assets in a Networked Environment, Dec. 21, 2021.

(Continued)

*Primary Examiner* — Jimmy H Tran
(74) *Attorney, Agent, or Firm* — Knobbe, Martens, Olson & Bear, LLP (57) ABSTRACT

A method and system for serving assets is disclosed, comprising receiving an asset request to serve an asset, wherein the asset request originates at an application, and wherein the asset request comprises an advertisement of an asset to be served and a request for the network address of an asset server configured to serve the requested asset. The method further comprises causing a service discovery server to identify an asset server configured to serve the requested asset, and causing the requested asset to be served to the application.

16 Claims, 5 Drawing Sheets

(51) Int. Cl.
*H04L 9/40* (2022.01)
*H04L 67/02* (2022.01)

(56) References Cited

U.S. PATENT DOCUMENTS

| | | | | |
|---|---|---|---|---|
| 9,432,379 | B1* | 8/2016 | Roche | H04L 63/0807 |
| 9,774,586 | B1* | 9/2017 | Roche | H04L 63/08 |
| 10,007,534 | B2* | 6/2018 | Williams | G06F 21/604 |
| 10,552,480 | B1* | 2/2020 | Stankowicz | G06F 8/61 |
| 11,206,310 | B2 | 12/2021 | Fink et al. | |
| 2005/0044197 | A1* | 2/2005 | Lai | H04L 67/02 |
| | | | | 709/223 |
| 2006/0165105 | A1* | 7/2006 | Shenfield | G06F 9/546 |
| | | | | 370/401 |
| 2006/0259578 | A1* | 11/2006 | Fritsch | H04W 8/005 |
| | | | | 709/217 |
| 2007/0282899 | A1* | 12/2007 | Goodman | H04L 67/568 |
| 2009/0241104 | A1* | 9/2009 | Amiga | G06F 8/71 |
| | | | | 717/174 |
| 2011/0246337 | A1* | 10/2011 | Wisman | G06Q 10/087 |
| | | | | 705/28 |
| 2013/0080507 | A1* | 3/2013 | Ruhlen | H04L 67/1001 |
| | | | | 709/203 |
| 2013/0091252 | A1* | 4/2013 | Pizzorni | H04L 69/329 |
| | | | | 709/219 |
| 2013/0104200 | A1* | 4/2013 | Choi | H04L 63/10 |
| | | | | 726/4 |
| 2013/0204906 | A1* | 8/2013 | Ko | G06F 16/972 |
| | | | | 707/E17.005 |
| 2014/0020083 | A1* | 1/2014 | Fetik | G06F 21/78 |
| | | | | 726/11 |
| 2014/0025424 | A1* | 1/2014 | Juillard | G06Q 10/06316 |
| | | | | 705/7.26 |
| 2015/0058749 | A1* | 2/2015 | Hwu | H04L 67/52 |
| | | | | 709/204 |
| 2015/0222517 | A1* | 8/2015 | McLaughlin | H04L 67/55 |
| | | | | 713/171 |
| 2015/0227725 | A1* | 8/2015 | Grigg | G06F 21/31 |
| | | | | 726/7 |
| 2015/0288702 | A1* | 10/2015 | Choe | H04L 63/102 |
| | | | | 726/1 |
| 2015/0319252 | A1* | 11/2015 | Momchilov | H04L 67/01 |
| | | | | 709/223 |
| 2016/0132310 | A1* | 5/2016 | Koushik | G06F 9/452 |
| | | | | 717/176 |
| 2016/0335454 | A1* | 11/2016 | Choe | G06Q 30/018 |
| 2017/0004582 | A1* | 1/2017 | Engstrom | G06Q 20/14 |
| 2017/0046181 | A1* | 2/2017 | Williams | H04L 63/0823 |
| 2017/0099280 | A1* | 4/2017 | Goel | H04L 67/146 |
| 2018/0026984 | A1* | 1/2018 | Maker | H04L 63/102 |
| | | | | 726/4 |
| 2018/0077222 | A1* | 3/2018 | Shnitko | H04L 67/06 |
| 2018/0083967 | A1* | 3/2018 | Subramanian | H04L 67/02 |
| 2018/0278602 | A1* | 9/2018 | Koushik | H04L 63/0853 |
| 2018/0351828 | A1* | 12/2018 | Mithal | G06F 9/45558 |
| 2018/0367528 | A1* | 12/2018 | Schwarz | H04L 9/0894 |
| 2019/0028514 | A1* | 1/2019 | Barboi | H04L 63/20 |
| 2019/0057204 | A1* | 2/2019 | Marcovecchio | H04L 63/1433 |
| 2019/0124161 | A1* | 4/2019 | Fink | H04L 63/08 |
| 2019/0319808 | A1* | 10/2019 | Fallah | H04L 9/3265 |
| 2020/0050494 | A1* | 2/2020 | Bartfai-Walcott | G06F 9/5083 |
| 2020/0092280 | A1* | 3/2020 | Li | G06F 21/44 |
| 2020/0219099 | A1* | 7/2020 | Mohassel | G06Q 40/02 |
| 2020/0236373 | A1* | 7/2020 | Dunham | G06F 16/7867 |
| 2021/0383013 | A1* | 12/2021 | Anneboina | H04L 63/10 |

OTHER PUBLICATIONS

Official Communication for European Patent Application No. 18201487.8 dated Feb. 4, 2022, 13 pages.

Anonymous, "API Gateway OAuth 2.0 Authentication Flows," Oracle, Sep. 6, 2015, retrieved from the Internet: https://web.archive.org/web/20150906063003/https://docs.oracle.com/cd/E50612_01/doc.11122/oauth_guide/content/oauth_flows.html,12 pp.

Anonymous, "Lightweight Third Party Authentication (LTPA)—IBM Documentation," retrieved from the Internet: https://www.ibm.com/docs/en/wip-mg/5.0.0?topic-authentication-lightweight-third-party-ltpa, Feb. 2, 2022, 6 pages.

* cited by examiner

SERVING ASSETS IN A NETWORKED ENVIRONMENT

RELATED APPLICATIONS

The present disclosure references various features of and is a continuation of U.S. patent application Ser. No. 16/165,229, filed Oct. 19, 2018, which application claims the benefit of priority to foreign (GB) App. No. 1717251.1, filed Oct. 20, 2017, the entire disclosure of which is hereby made part of this specification as if set forth fully herein and incorporated by reference for all purposes, for all that it contains.

TECHNICAL FIELD

The present disclosure relates to methods and systems of serving assets in a networked environment.

BACKGROUND

Cloud computing is a computing infrastructure for enabling ubiquitous access to shared pools of servers, storage, computer networks, applications and data assets, which can be rapidly provisioned, often over the Internet.

Hitherto, when applications have required data assets, these data assets have been served from the application itself. In such approaches, each application maintains its own local database containing the assets required by that application. This usual approach requires a full web server that can serve all API requests as well as all of the assets required by the application. In platforms intended to serve multiple application, such approaches lead to a large amount of code duplication.

SUMMARY

A first aspect provides a method comprising: receiving an asset request to serve an asset, wherein the asset request originates at an application, and wherein the asset request comprises an advertisement of an asset to be served and a request for the network address of an asset server configured to serve the requested asset; causing a service discovery server to identify an asset server configured to serve the requested asset; and causing the requested asset to be served to the application.

Causing the requested asset to be served to the application may comprise causing the service discovery server to send an asset service instruction message to the asset server configured to serve the requested asset to serve the requested asset to the application.

The method may further comprise: retrieving, by the asset server configured to serve the requested asset, the requested asset from an asset repository; and serving, by the asset server configured to serve the requested asset, the requested asset to the application.

The method may further comprise: identifying, by the asset server, one or more versions of the requested asset in the asset repository; selecting, by the asset server, a most recent version of the requested asset; and serving the most recent version of the requested asset to the application.

Identifying the one or more versions of the requested asset in the asset repository may comprise accessing an index file from the asset repository, the index file containing a list of versions of respective assets stored in the asset repository.

The method may further comprise causing an authentication procedure to be executed to determine whether the application is authorised to receive the requested asset.

The method may further comprise, if the application is positively authenticated, causing a virtual token to be issued to the application.

The virtual token may be incorporated in the asset request.

The method may further comprise identifying a permission level associated with the virtual token.

The method may further comprise identifying an asset associated with the permission level.

The virtual token may be a multipass token.

The asset request may further comprise a version constraint specifying one or more versions of the requested asset to be served.

The asset may be a static asset.

A further aspect provides a computer program comprising computer readable code that, when executed by a computing apparatus, causes the computing apparatus to perform the method of any preceding definition.

A further aspect provides an apparatus comprising one or more processors or special-purpose computing hardware configured to perform the method of any preceding method definition.

A further aspect provides a non-transitory computer-readable storage medium having stored thereon computer-readable code, which, when executed by at least one processor, causes the at least one processor to perform a method, comprising: receiving an asset request to serve an asset, wherein the asset request originates at an application, and wherein the asset request comprises an advertisement of an asset to be served and a request for the network address of an asset server configured to serve the requested asset; causing a service discovery server to identify an asset server configured to serve the requested asset; and causing the requested asset to be served to the application.

A further aspect provides an apparatus, the apparatus having at least one processor and at least one memory having computer-readable code stored thereon which when executed controls the at least one processor: to receive an asset request to serve an asset, wherein the asset request originates at an application, and wherein the asset request comprises an advertisement of an asset to be served and a request for the network address of an asset server configured to serve the requested asset; to cause a service discovery server to identify an asset server configured to serve the requested asset; and to cause the requested asset to be served to the application.

BRIEF DESCRIPTION OF THE DRAWINGS

Example embodiments will now be described by way of non-limiting example with reference to the accompanying drawings, in which.

DETAILED DESCRIPTION

In brief, this specification provides methods and systems that provide, as part of a central platform, a content delivery network comprising one or more asset servers configured to serve data assets to one or more applications that request particular data assets.

An application at the front end of a platform sends an asset request message that advertises what asset(s) are required by the application as well as requesting the network address of an asset server which is configured to serve the requested asset. The asset server which is configured to serve the requested asset is located using a service discovery mechanism. The requested asset is then provided to the application by the appropriate asset server. Example assets may include dynamic or static assets such as HTML pages, JavaScript files, Cascading Style Sheets (CSS) files and so forth.

This means that the requirement of storing data assets as part of the infrastructure of each individual application is eliminated. Thus, much of the backend functionality of each of the applications can be centralised within the central platform. Since the various applications that use a central platform are distributed remotely with respect to each other and with respect to the central platform, this leads to a considerable reduction in the overall amount of computational infrastructure that needs to be deployed for each application. In other words, this leads to a simplification of build processes. This, in turn, leads to significant cost savings, avoids code duplication and furthermore provides greater options for front end plugins.

The software platform may be an enterprise software platform associated with an enterprise platform provider. An enterprise software platform enables use by multiple users and applications, internal and external to the enterprise platform provider. The users may be users of different respective organisations, such as different commercial companies.

Figure 1:
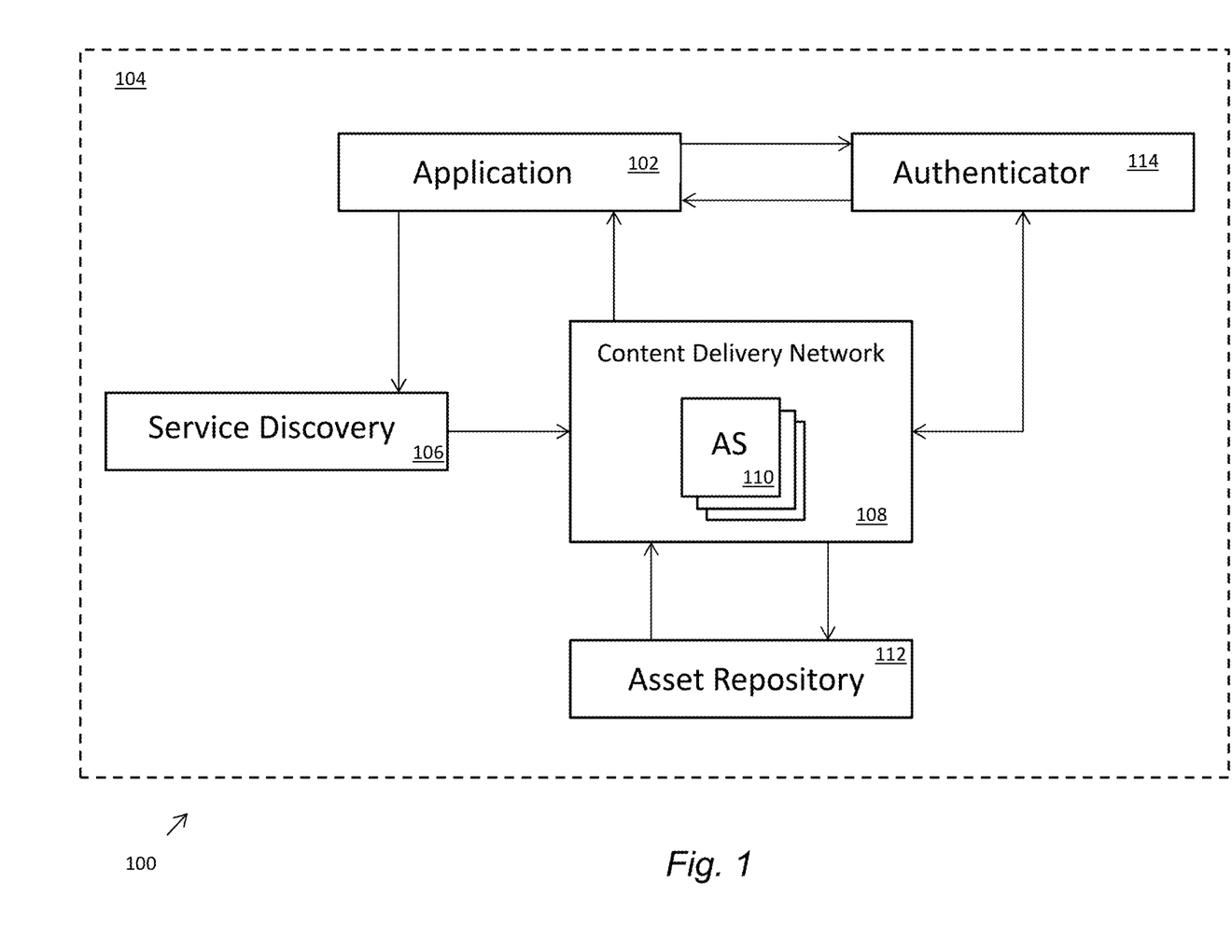
FIG. 1 is a network diagram depicting a network system according to example embodiment(s)

FIG. 1 is a network diagram depicting a network system 100 comprising an application 102 and a central platform 104. The application 102 and the central platform interact as front end and backend, respectively. For the sake of simplicity, only one application is depicted in FIG. 1. However, it should be understood that any number of applications may interact with the central platform 104.

The central platform 104 comprises a service discovery system 106, a content discovery network 108 comprising one or more asset servers 110 and an asset repository 112. In some embodiments, such as the one shown in FIG. 1, the network system 100 further comprises an authenticator 114. Each component of the central platform 104, including each of the asset servers 110, may be located in a separate physical location over a distributed network.

As the content delivery network 108 may be deployed over several machines, using a service discovery system 106 is advantageous since particular data assets may move over time. Using a service discovery mechanism ensures that the correct asset server is found in response to each asset request. In addition to the location of an asset changing, the content of a data asset can change over time. As applications request data assets, up-to-date versions of the requested assets can be provided for example as an application user refreshes a page displayed by the application. As such, updating data assets is simplified because newer versions of data assets only need to be saved into the asset repository 112 of the central platform 104.

In some embodiments, access to data assets may be restricted by using an authentication system, such as the authenticator 114 of FIG. 1. In this example embodiment, the authenticator 114 is configured to issue a virtual token in response to successful authentication of the application 102. Authentication of the application may take the form of authenticating a user of an application for example, by requesting a username and password be input via a user interface of the application. The virtual token may then be incorporated into an asset request that is submitted to the service discovery system 106 of the central platform 104. In other embodiments, other methods of authentication of an application and/or a user of the application, as well as protocols for communicating authentication information and securing access to the content delivery network 108 may be implemented.

Figure 2:
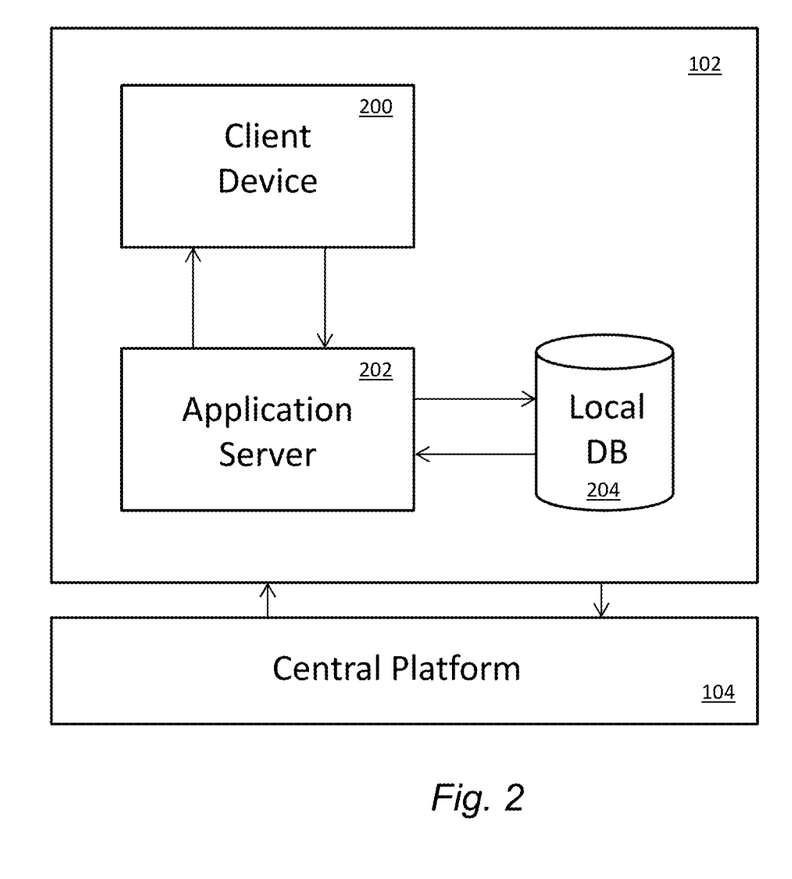
FIG. 2 is a block diagram showing in greater detail an application used in the FIG. 1 network diagram, according to example embodiment(s)

FIG. 2 is a block diagram showing the application 102 in more detail. In this example embodiment, the application 102 itself comprises front end and back end portions. At the application front end, a client device 200 may be provided. At the application back end, an application server 202 may be provided. The application server 202 may have access to a local database 204 which stores information relevant to the functionality of the particular application 102. However, data assets that are used by other applications that interact with the central platform 104 are not stored in the local database 204. Such data assets are, instead, stored in the asset repository 112 of the central platform 104, and requested by the application 102 as needed. In some embodiments, a particular data asset may be requested from the asset repository 112 each time it is used by the application 102, while in other embodiments the particular data asset may be requested again from the asset repository 112 only if a predetermined time has passed since the same asset was previously retrieved from the asset repository 112.

The application 102 may be configured to interact with the central platform 104 via a network.

Figure 3:
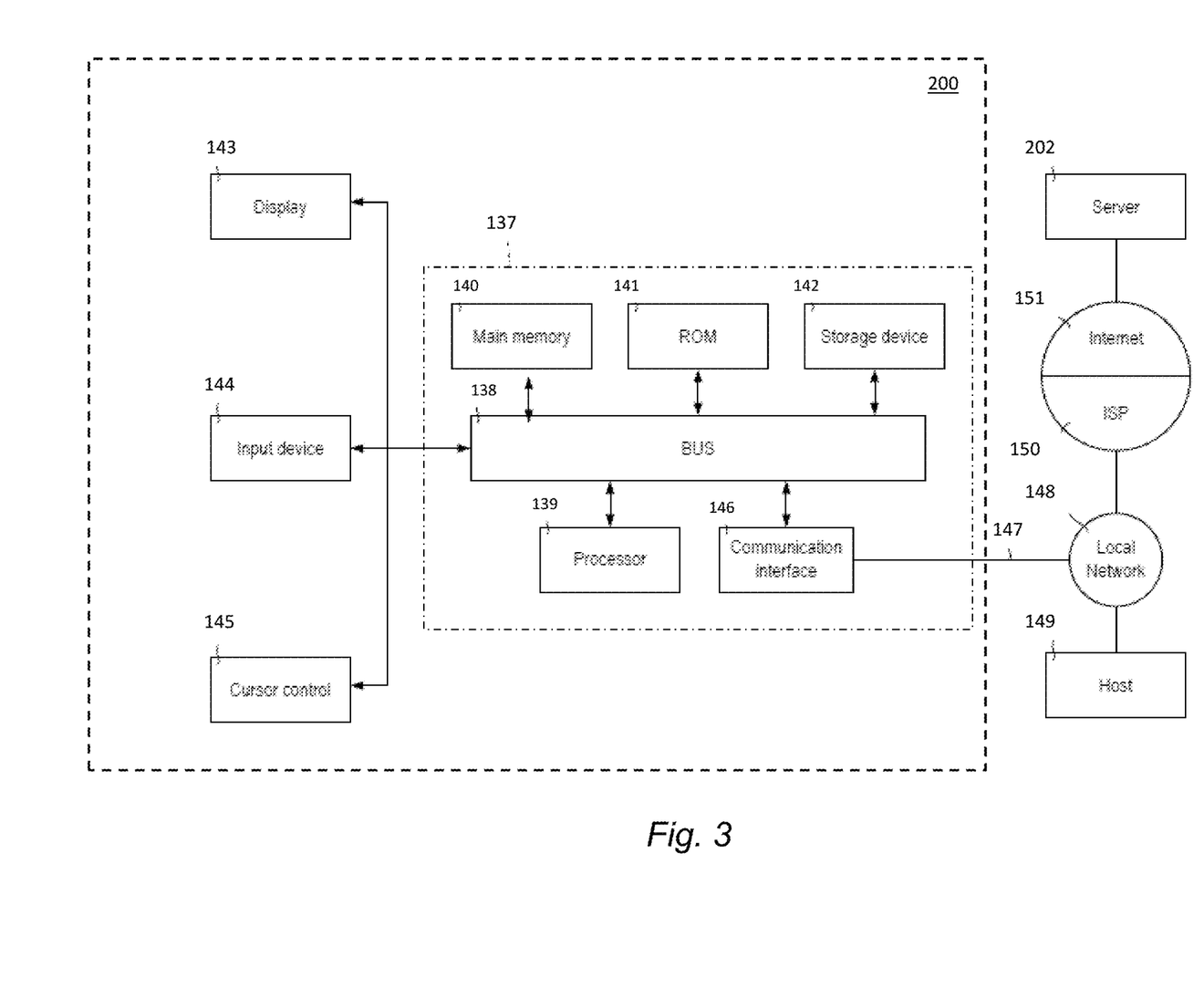
FIG. 3 is a very general block diagram of a computing device in which the example embodiment(s) may be embodied.

FIG. 3 is a block diagram showing one embodiment of the client device 200, the application server 202 and intermediate entities of an application network. The client device 200 comprises a computer system 137. Depending on the implementation, computing systems discussed herein may include fewer or additional components, and the components may be configured in different arrangements, such as in various distributed configurations.

Computer system 137 includes a bus 138 or other communication mechanism for communicating information, and a hardware processor 139 coupled with bus 138 for processing information. Hardware processor 139 can be, for example, a general purpose microprocessor. Hardware processor 139 comprises electrical circuitry.

Computer system 137 includes a main memory 140, such as a random access memory (RAM) or other dynamic storage device, which is coupled to the bus 138 for storing information and instructions to be executed by processor 139. The main memory 140 can also be used for storing temporary variables or other intermediate information during execution of instructions by the processor 139. Such instructions, when stored in non-transitory storage media accessible to the processor 139, render the computer system 137 into a special-purpose machine that is customized to perform the operations specified in the instructions.

Computer system 137 further includes a read only memory (ROM) 141 or other static storage device coupled to the bus 138 for storing static information and instructions for the processor1 139. A storage device 142, such as a magnetic disk or optical disk, is provided and coupled to the bus 138 for storing information and instructions.

Computer system 137 can be coupled via the bus 138 to a display 143, such as a cathode ray tube (CRT), liquid crystal display, or touch screen, for displaying information to a user. An input device 144, including alphanumeric and other keys, is coupled to the bus 138 for communicating information and command selections to the processor 139. Another type of user input device is cursor control 145, for example using a mouse, a trackball, or cursor direction keys for communicating direction information and command selections to the processor 139 and for controlling cursor movement on the display 143. The input device typically has two degrees of freedom in two axes, a first axis (for example, x) and a second axis (for example, y), that allows the device to specify positions in a plane.

Computer system 137 can implement the techniques described herein using customized hard-wired logic, one or more ASICs or FPGAs, firmware and/or program logic which in combination with the computer system causes or programs computer system 137 to be a special-purpose machine. According to some embodiments, the operations, functionalities, and techniques disclosed herein are performed by computer system 137 in response to the processor 139 executing one or more sequences of one or more instructions contained in the main memory 140. Such instructions can be read into the main memory 40 from another storage medium, such as storage device 142. Execution of the sequences of instructions contained in main memory 140 causes the processor 139 to perform the process steps described herein. In alternative embodiments, hard-wired circuitry can be used in place of or in combination with software instructions.

The term "storage media" as used herein refers to any non-transitory media that stores data and/or instructions that cause a machine to operate in a specific fashion. Such storage media can comprise non-volatile media and/or volatile media. Non-volatile media includes, for example, optical or magnetic disks, such as storage device 142. Volatile media includes dynamic memory, such as main memory 140. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but can be used in conjunction with, transmission media. Transmission media participates in transferring information between storage media. For example, transmission media includes coaxial cables, copper wire and fibre optics, including the wires that comprise bus 138. Transmission media can also take the form of acoustic or light waves, such as those generated during radio-wave and infra-red data communications.

Various forms of media can be involved in carrying one or more sequences of one or more instructions to processor 139 for execution. For example, the instructions can initially be carried on a magnetic disk or solid state drive of a remote computer. The remote computer can load the instructions into its dynamic memory and send the instructions over a telephone line or other transmission medium using a modem. A modem local to computer system 137 can receive the data on the telephone line or other transmission medium and use an infra-red transmitter to convert the data to an infra-red signal. An infra-red detector can receive the data carried in the infra-red signal and appropriate circuitry can place the data on bus 138. Bus 138 carries the data to the main memory 140, from which the processor 139 retrieves and executes the instructions. The instructions received by the main memory 140 can optionally be stored on the storage device 142 either before or after execution by the processor 139.

Computer system 137 also includes a communication interface 146 coupled to the bus 138. The communication interface 146 provides a two-way data communication coupling to a network link 147 that is connected to a local network 148. For example, the communication interface 146 can be an integrated services digital network (ISDN) card, cable modem, satellite modem, or a modem to provide a data communication connection to a corresponding type of telephone line. As another example, the communication interface 146 can be a local area network (LAN) card to provide a data communication connection to a compatible LAN. Wireless links can also be implemented. In any such implementation, the communication interface 146 sends and receives electrical, electromagnetic or optical signals that carry digital data streams representing various types of information.

The network link 147 typically provides data communication through one or more networks to other data devices. For example, the network link 147 can provide a connection through the local network 148 to a host computer 149 or to data equipment operated by an Internet Service Provider (ISP) 150. The ISP 150 in turn provides data communication services through the world wide packet data communication network now commonly referred to as the "Internet" 151. The local network 148 and internet 151 both use electrical, electromagnetic or optical signals that carry digital data streams. The signals through the various networks and the signals on the network link 147 and through the communication interface 146, which carry the digital data to and from the computer system 137, are example forms of transmission media. Through these intermediate network entities, the client device 200 can communicate with the application server 202.

Figure 4:
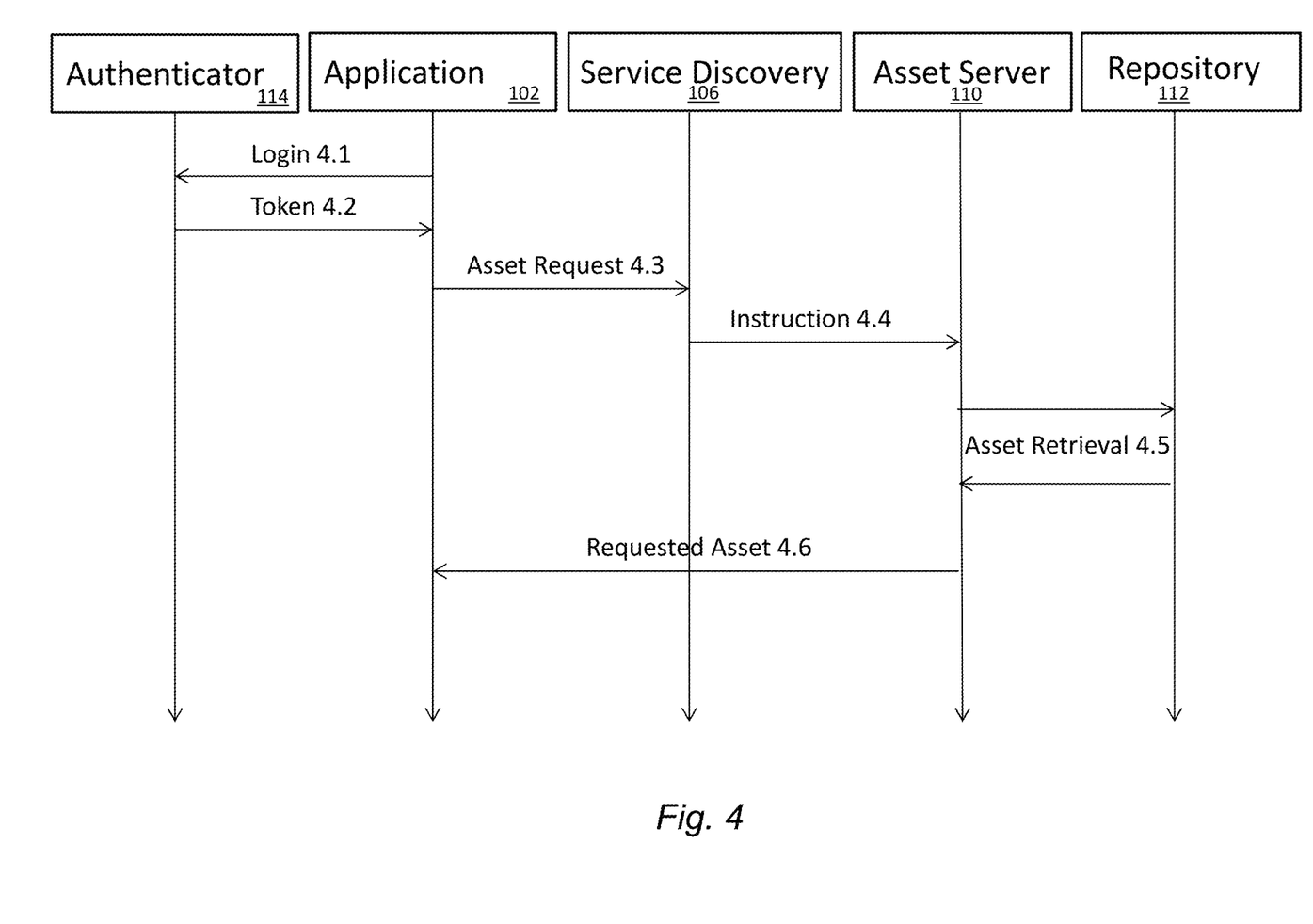
FIG. 4 schematically illustrates a timeline of operations performed by elements of the FIG. 2 network diagram, according to example embodiments.

FIG. 4 schematically illustrates a timeline of operations performed by the application 102, service discovery system 106, asset server 110, asset repository 112 and authenticator 114. These operations are shown in the context of the interactions between these entities.

At operation 4.1, the application 102 submits an authentication request to the authenticator 114. The authentication request may take the form of a user entering a username and password into a user interface displayed by the application via a client device.

At operation 4.2, in response to a successful authentication of the application or of the user of the application, the authenticator 114 issues a virtual token to the application 102. In one embodiment, the virtual token is a cryptographic statement confirming the identity of the application or of the user of the application. For example, the virtual token may be a Multipass JSON web token. The virtual token may indicate a permission level. For example, a first type of virtual token may be issued indicating that the user has an 'Administrator' status whilst a second type of virtual token may be issued indicating that the user only has a 'User' status indicating a lower permission level.

At operation 4.3, the application 102 sends an asset request message to the service discovery system 106.

Figure 5:
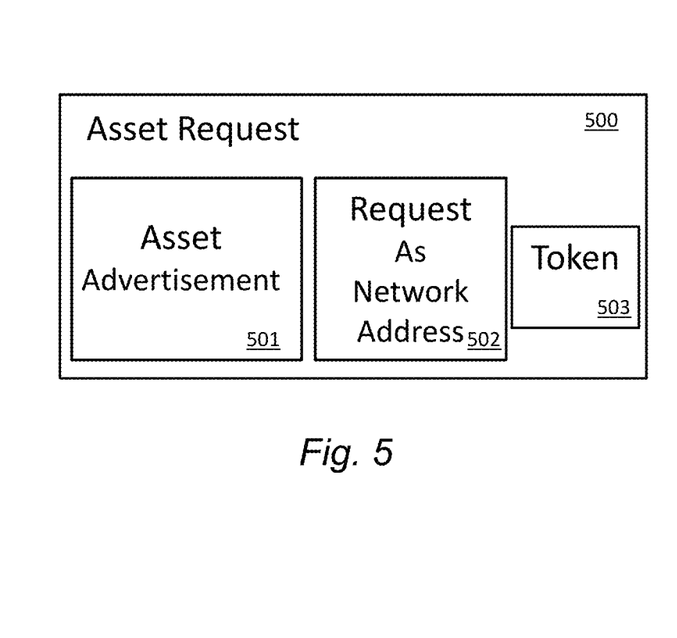
FIG. 5 shows an example asset request message, according to example embodiments.

An example asset request message 500 is shown in FIG. 5. The asset request message 500 contains an asset advertisement 501, a request 502 for the network address of the asset server configured to provide the requested asset. In embodiments where authentication is employed, the asset request message 500 also contains a virtual token 503.

In some embodiments, the asset request message 500 further comprises a version constraint specifying one or more versions of the requested asset to be served. This allows the user greater flexibility to have assets served in accordance with a specification set by the user.

A request for the particular asset or assets, in the form of an asset advertisement 501, serves to inform the central platform 104 which assets are to be served to the application 102. This ensures that only those assets requested by the application 102 are served and that no unnecessary data assets are served. By providing the virtual token 503 in the asset request message 500, it is possible for the elements within the central platform 104 to determine what permissions the application 102 or user of the application 102 has. This can help to ensure that assets are served to the user in accordance with that user's access rights.

The service discovery system 106 is configured to execute a service discovery mechanism to discover which asset server 110 within the content delivery network 108 is configured to serve the requested asset to the application 102. Such service discovery may be performed using any suitable discovery protocol and may involve routing suitable remote procedure calls (RPC) through the content delivery network 108 to find the asset server 110 within the content delivery network 108 which is configured to serve the request asset to the application 102.

Once the service discovery system 106 has identified the asset server 110 within the content delivery network 108 which is configured to serve the request asset to the application 102, the service discovery system 106 sends an instruction message to the identified asset server 110, at operation 4.4. The instruction message may also contain the virtual token 503.

At operation 4.5, the asset server 110 retrieves the requested asset from the asset repository 112. In embodiments using authentication, the asset request message and instruction message may both contain the virtual token which allows the retrieved asset to be in accordance with any permissions that are set for the application 102 or the particular user of the application 102.

Depending on the type of asset, different versions thereof may be stored in the asset repository 112. The asset server 110 may identify one or more versions of the requested asset in the asset repository 112. The different versions of respective assets may be listed in an index file in the asset repository 112 which is readable by the asset server 110. The asset server 110 may be configured to select the most recent version of the data asset, retrieve said most recent version and serve said most recent version to the application 102. In some embodiments, different versions of an assets may be accessible by different asset servers 110, such that selection of the appropriate asset server 110 by the service discovery system 106 considers which version of the assets to serve to the application 102 and selects the asset server 110 that is best suited to serve that version of the assets to the application 102.

The asset server 110 may have access to a library containing permissions associated with different types of token. For example, certain data assets may be only be served in response to receipt of a request containing an 'Administrator' token. The asset server 110 may identify the permission level associated with the virtual token. The asset server 110 may then retrieve data assets in accordance with the identified permission level.

At operation 4.6, the asset server 110 serves the requested asset to the application 102. The application 102 can then consume the served asset. For example, the served asset may be an HTML page or CSS file which can then be used by the application to provide content to a user of the application 102. In some embodiments, certain assets may not directly impact content that is provided to the user of the application 102, and may initiate request for further assets, such as via the service discovery system 106 discussed herein. Thus, asset requests may be linked and automatically executed as other assets are retrieved from prospective as is 110.

Figure 6:
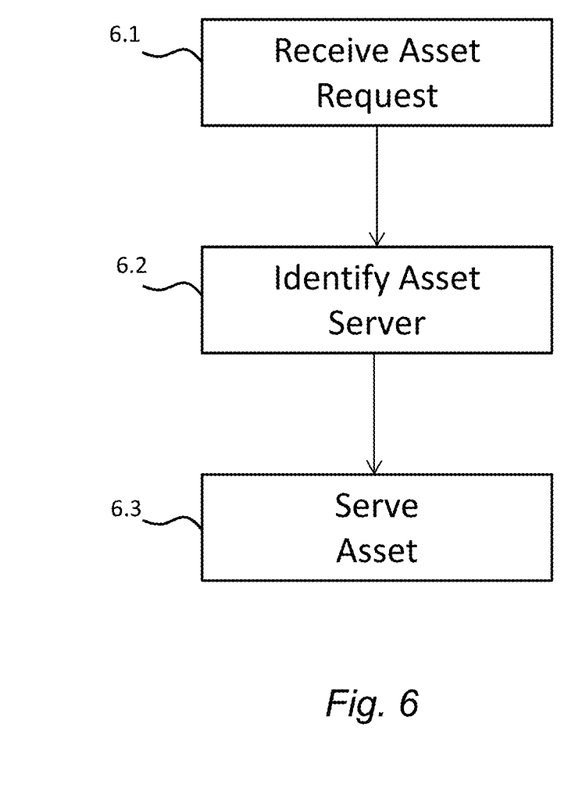
FIG. 6 is a flow chart illustrating operations taken in embodiments of the disclosure.

FIG. 6 is a flow chart illustrating operations taken in embodiments of the disclosure.

At operation 6.1, the central platform 104 receives an asset request to serve a data asset. The asset request originates at an application 102. The asset request comprises an advertisement of an asset to be served and a request for the network address of an asset server configured to serve the requested asset. At operation 6.2, a service discovery system identifies an asset server configured to serve the requested asset. At operation 6.3, the requested asset is served to the application 102.

The above-described computer hardware and software is presented for purpose of illustrating the underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, the example embodiment(s) of the present invention have been described with reference to numerous specific details. However, the details may vary from implementation to implementation according to the requirements of the particular implement at hand. The example embodiment(s) are, accordingly, to be regarded in an illustrative rather than a restrictive sense.

What is claimed is:

1. A method comprising:
    receiving, at a service discovery server comprising one or more hardware computer processors, an asset request message from an application when the application requires a data asset, wherein the asset request message comprises an advertisement of the data asset, a version constraint specifying one or more versions of the data asset, and a request for a network address of an asset server configured to serve the data asset;
    causing the service discovery server to automatically identify, based at least on the version constraint, from a plurality of asset servers, an asset server configured to serve the data asset; and
    causing the service discovery server to send an asset service instruction message to the identified asset server causing the asset server to serve the data asset to the application requiring the data asset.

2. The method of claim 1, further comprising:
    retrieving, by the identified asset server, the data asset from an asset repository; and
    serving, by the identified asset server, the data asset to the application.

3. The method of claim 2, further comprising:
identifying, by the identified asset server, the one or more versions of the data asset in the asset repository, based at least on the version constraint;
selecting, by the identified asset server, a most recent version of the data asset; and
serving the most recent version of the data asset to the application.

4. The method of claim 3, wherein identifying the one or more versions of the data asset in the asset repository comprises accessing an index file from the asset repository, the index file containing a list of versions of respective assets stored in the asset repository.

5. The method of claim 1, further comprising causing an authentication procedure to be executed to determine whether the application is authorized to receive the data asset.

6. The method of claim 5, further comprising, if the application is positively authenticated, causing a virtual token to be issued to the application.

7. The method of claim 6, wherein the virtual token is incorporated in the asset request message.

8. The method of claim 7, further comprising identifying a permission level associated with the virtual token.

9. The method of claim 8, further comprising identifying an asset associated with the permission level.

10. The method of claim 6, wherein the virtual token is a multipass token.

11. The method of claim 6, wherein the virtual token is a JSON web token.

12. The method of claim 1, wherein the data asset is a static asset.

13. The method of claim 12, wherein the data asset comprises HTML pages, JavaScript files, or Cascading Style Sheets (CSS) files.

14. The method of claim 1, further comprising:
receiving, at the service discovery server, a second asset request message from the application for the data asset;
in response to determining that a predetermined time has passed since the data asset was served to the application, causing the service discovery server to send a second asset service instruction message to the identified asset server causing the identified asset server to serve the data asset for a second time to the application.

15. A non-transitory computer readable medium storing computer readable code that, when executed by a computing apparatus, causes a computing apparatus to:
receive an asset request message from an application when the application requires a data asset, wherein the asset request message comprises an advertisement of the data asset, a version constraint specifying one or more versions of the data asset and a request for a network address of an asset server configured to serve the data asset;
automatically identify, based at least on the version constraint, from a plurality of asset servers, an asset server configured to serve the data asset; and
send an asset service instruction message to the identified asset server causing the asset server to serve the data asset, to the application requiring the data asset.

16. An apparatus comprising:
a non-transitory computer readable medium storing computer readable code; and
one or more processors or special-purpose computing hardware configured to execute the computer readable code to cause the apparatus to:
receive an asset request message from an application when the application requires a data asset, wherein the asset request message comprises an advertisement of the data asset, a version constraint specifying one or more versions of the data asset and a request for a network address of an asset server configured to serve the data asset;
automatically identify, based at least on the version constraint, from a plurality of asset servers, an asset server configured to serve the data asset; and
send an asset service instruction message to the identified asset server causing the asset server to serve the data asset, to the application requiring the data asset.

* * * * *